United States Patent [19]
Harada et al.

[11] Patent Number: 5,731,860
[45] Date of Patent: Mar. 24, 1998

[54] METHOD OF MANUFACTURING LIQUID CRYSTAL PANEL AND PRESS DEVICE TO BE ADOPTED IN THE METHOD

[75] Inventors: Yoshinori Harada, Osaka; Yoshihiro Izumi, Kashihara, both of Japan

[73] Assignee: Sharp Kabushiki Kaisha, Osaka, Japan

[21] Appl. No.: 651,767

[22] Filed: May 22, 1996

[30] Foreign Application Priority Data

Jun. 28, 1995 [JP] Japan .................. 7-162700

[51] Int. Cl.⁶ .................. G02F 1/1335; G02F 1/1333; A47J 51/00
[52] U.S. Cl. .................. 349/158; 349/112; 38/71
[58] Field of Search .................. 349/112, 158; 38/71

[56] References Cited

FOREIGN PATENT DOCUMENTS 63-311227  12/1988  Japan .

*Primary Examiner*—William L. Sikes
*Assistant Examiner*—Julie Ngo
*Attorney, Agent, or Firm*—David G. Conlin; William J. Daley, Jr.

[57] ABSTRACT

A method of manufacturing a liquid crystal panel includes the steps of adjusting mutual positions of a pair of substrates, applying a pressure onto a sealing material made of a ultraviolet-curing resin applied onto the substrates, and hardening a predetermined temporal combining area of the sealing material by emitting a UV ray to be incident thereon. The resulting temporary fixed substrate is placed on a stage of a final hardening press device, and an embossed sheet having fine protrusions and recessions uniformly formed on a surface thereof is lowered to be superimposed onto the temporary fixed substrate. Further, by applying a vacuum suction to a sealed space between the stage and the embossed sheet, the entire surface of the temporary fixed substrate is pressurized under an atmospheric pressure to form a uniform cell gap as desired. Thereafter, a UV ray is applied by a UV lamp to finally harden the sealing material. As a result, a liquid crystal panel having an excellent positioning precision and a cell gap precision can be manufactured at high yield.

16 Claims, 12 Drawing Sheets

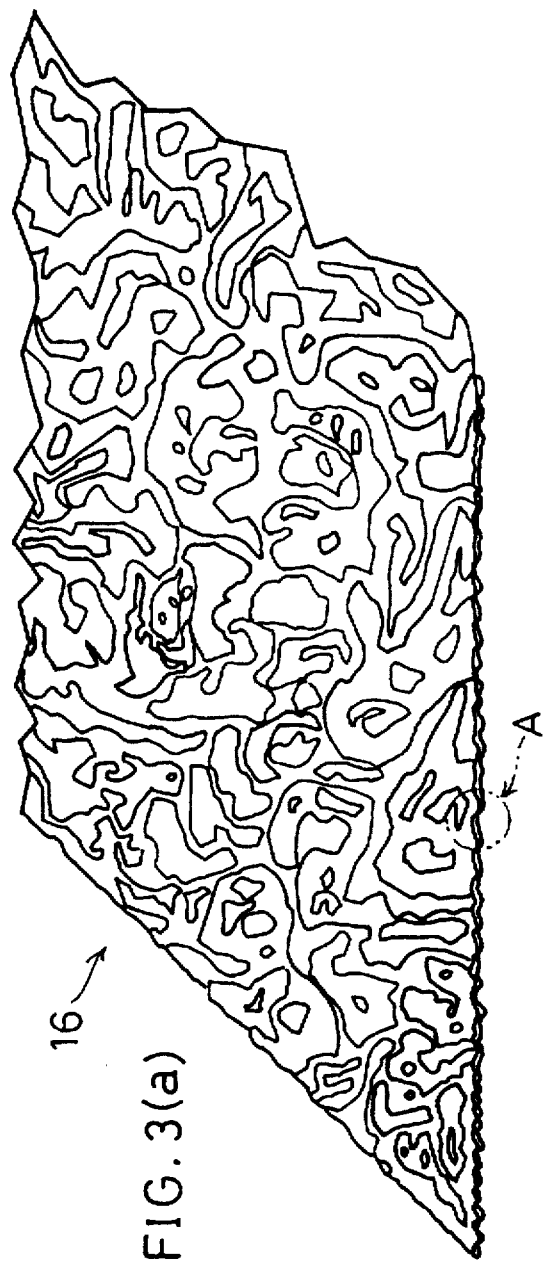
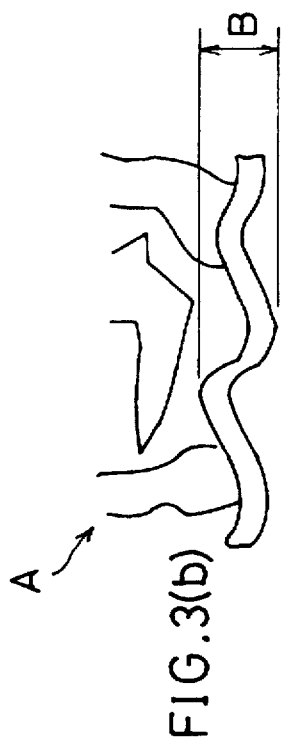
FIG. 3(a)
FIG. 3(b)

METHOD OF MANUFACTURING LIQUID CRYSTAL PANEL AND PRESS DEVICE TO BE ADOPTED IN THE METHOD

FIELD OF THE INVENTION

The present invention relates to a method of manufacturing liquid crystal panels and a press device to be adopted in the method, more particularly relates to a method of manufacturing liquid crystal panels with substrates of a large-size and to a press device to be adopted in such method.

BACKGROUND OF THE INVENTION

A method of manufacturing, for example, a TFT (thin film transistor) color liquid crystal display device as an example of liquid crystal display devices includes mainly three processes: a TFT array process for forming a TFT, etc., on a substrate, a panel process and a module process for mounting peripheral circuits, etc., on a panel. In the panel process, first, orientation films are formed on a pair of substrates. Then, a sealing material applied to at least one of the substrates is hardened to connect the pair of substrates with a predetermined cell gap between them. Thereafter, the resulting substrates thus connected go through further processes such as cut division, liquid crystal injection, mounting of a polarization plate, etc., thereby obtaining a liquid crystal panel. With regard to the described panel process, the process of connecting two substrates requires high precision in positioning the pair of substrates and connecting them so as to have a uniform cell gap between the substrates. To achieve an improved precision in the described processes is a key to realize a still up-sized liquid crystal display device with improved precision.

The described process of connecting the pair of substrates mainly includes two processes: a temporary hardening press process and a final hardening press process. In the temporary hardening press process, first, a sealing material is applied to one of the substrates, while applies spacers to the other substrate to ensure a uniform cell gap. Next, the substrates are placed so as to oppose to one another, and thereafter, a high-precision positioning of the substrates is performed using a positioning index called "alignment mark". Then, the substrates are brought close to one another and the applied sealing material is pressed to temporarily fix the substrates. Here, to prevent a displacement in positioning that may occur in the subsequent process, generally, a part of the sealing material is hardened by directing thereto, for example, a ultraviolet ray. In this way, a still more precise temporary fixing process can be achieved.

In the final hardening press process, a cell gap is formed by means of a press device between the substrates which are temporarily fixed by the described temporary hardening press process. When a uniform cell gap is ensured between the substrates, the sealing material is hardened.

In the final press method, a heat platen pressing adopting a heat platen is typically performed. In the heat platen pressing, a thermosetting resin is employed for the sealing material, and a pressure of around 1 kg/cm² is applied uniformly onto the entire substrates while maintaining a condition that the temperature of the heat platen is uniform in a vicinity of a predetermined temperature set in a range of 130°–170° C. with precision. The described method offers a highly reliable bonding force. However, the method has the following drawbacks. That is, as the method requires a high temperature process, the substrates would be expanded, which might result in the problem that the substrates are displaced when positioning them or a non-uniform cell gap is formed between them, etc. Moreover, the process requires a relatively long time for hardening the sealing material. Besides, when the described process is applied to manufacture a liquid crystal panel adopting the substrates of a large size, flat and uniform characteristics in the press process are difficult to adjust to the size. Furthermore, as the method requires the pressurizing process with an applied pressure of around 1 kg/cm², a load of some tons is required when adopting the substrates of a large size, thereby presenting the problem that the device becomes larger in size.

To eliminate the described problems, a UV pressing using a ultraviolet-curing resin as a sealing material has been viewed with interest as an alternative method of the heat platen pressing. The UV pressing has the beneficial features that a temperature control is not required, and a displacement in positioning the substrates and a non-uniform cell gap caused by thermal expansion can be eliminated. Additionally, the described UV pressing requires a relatively short period of time. As an example of such UV pressing, a UV surface plate pressing and a UV vacuum pressing have been proposed.

In the UV surface plate pressing, a surface plate to be pressed does not require a face precision as high as the heat platen. To achieve an improved illuminance of a ultraviolet ray, a fixed surface plate made of quartz glass is adopted. In the UV surface plate pressing, first, a pressure of around 1 kg/cm² is applied uniformly on the entire surface of the substrates, and under an applied pressure, a ultraviolet ray is directed thereon to harden the ultraviolet-curing resin. However, the described UV surface plate pressing also has the drawbacks associated with the heat platen pressing when applying it to manufacture a liquid crystal panel having substrates of a large size, i.e., flat and uniform characteristics in the press process are difficult to adjust to the size. Besides, the described UV surface plate pressing requires the device which is large in size and has a complicated structure.

On the other hand, the UV vacuum pressing offers such a beneficial feature that a pressure of 1 kg/cm² required in the press process is obtainable with ease by utilizing an atmospheric pressure, thereby permitting a miniaturization of the apparatus. As an example of the described UV vacuum press method, a method of manufacturing a liquid crystal panel by the UV vacuum pressing disclosed in Japanese Laid-Open Patent Application No. 311227/1988 (Tokukaisho 63-311227) will be explained below in reference to FIG. 9 and FIG. 10.

FIG. 9 is a perspective view of a temporary hardening press device 51 for use in the temporary hardening press process.

FIG. 10 is a perspective view of a final hardening press device 52 for use in the final hardening press process.

In the temporary hardening press device 51, positioning of a substrate 54 sucked onto a suction plate 53 and a substrate 56 sucked onto a suction plate 55 is performed using an objective lens 57, etc. Next, the suction of the substrate 54 is cancelled, and the pressure is applied by blowing air from an air application slit 58. Thereafter, a temporary fixed substrate 59 under an applied pressure is moved onto a suction surface plate 61 in a cabinet 60 of the final hardening press device 52 and is covered with a pressure application-use plastic sheet 62. Then, the plastic sheet 62 is air-tightly fixed to the cabinet 60 using a sheet fixing frame 63, and a vacuum suction between the suction surface plate 61 and the plastic sheet 62 is performed. As a result, using an atmospheric pressure on the plastic sheet 62, a pressure is applied to the temporary fixed substrate 59 with a uniform force. In the state where a desired cell gap is formed under a vacuum press on the temporary fixed substrate 59, a ultraviolet ray is directed thereon from a UV projection lamp 64 to harden a sealing material, thereby manufacturing a final fixed substrate.

However, the method of manufacturing a liquid crystal panel by the described UV vacuum pressing has the following drawbacks.

1. When dealing with substrates of a large size, as shown in FIGS. 11(a) and (b) and FIG. 12, an air 65 tends to remain between the plastic sheet 62 and the temporary fixed substrate 59 in the vacuum suction process. As a result, a pressure cannot be applied uniformly on the entire surface of the temporary fixed substrate 59 which would result in a non-uniform cell gap.

2. As a sudden vacuum press in the vacuum suction process generates a large stress on the temporary fixed substrate 59, the vacuum suction process must be applied step by step. Thus, the vacuum suction process would be complicated and requires a long time.

3. As shown in FIG. 13(a) and FIG. 13(b), a tensile force 68 against the final fixed substrate 66 that generates as the vacuum suction is released would become larger as the substrate becomes larger in size. This causes a peeling of the sealing material 67 or a damage of the final fixed substrate 66, which would lower a yield in manufacturing liquid crystal panels.

As described, in the conventional vacuum press processes, a precision in connecting the substrates and the yield in manufacturing liquid crystal panels would be lowered.

SUMMARY OF THE INVENTION

An object of the present invention is to provide a method of manufacturing liquid crystal panels, which permits an excellent positioning precision and a desirable yield even when adopting substrates of a large size and a press device to be adopted in such method.

To fulfill the above-mentioned object, a method of manufacturing a liquid crystal panel which includes the step of connecting a pair of substrates using a light-hardening type sealing material, includes the steps of:

(a) temporarily combining the pair of substrates by applying the light-hardening type sealing material on at least one of the pair of substrates;

(b) placing the pair of substrates on a placement plate;

(c) superimposing a flexible sheet member having fine protrusions and recessions formed uniformly on an entire surface thereof;

(d) uniformly applying a pressure onto an entire surface of the pair of substrates under atmospheric pressure by applying a vacuum suction to a sealed space between the placement plate and the flexible sheet member; and (e) hardening the light-hardening type sealing material by emitting light to be incident thereon.

According to the described method, when performing a vacuum suction, the protrusions and recessions formed uniformly on the surface of the flexible sheet facilitate an air exhaustion from the space between the flexible sheet member and the substrate on the upper side, and the air would not remain in the space. Therefore, the pressure in the space between the flexible sheet member and the substrate on the upper side is reduced uniformly. As a result, the pair of substrates is uniformly pressurized under atmospheric pressure on the flexible sheet member. In this way, after forming a uniform cell gap within the pair of substrates, the light-hardening type sealing material is hardened by emitting light to be incident thereon to connect the pair of substrates. The described method permits a liquid crystal panel having an excellent cell gap to be manufactured with precision even when adopting substrates of a large size.

Additionally, when performing a vacuum suction, the air in the space between the flexible sheet member and the substrate on the upper side can be exhausted uniformly and quickly. Therefore, the method of the present invention eliminates the necessity of dividing the process of vacuum suction into two or more stages or using two or more pressure reducing devices, from the conventional method, thereby permitting a prompt vacuum suction to be performed at a constant pressure reducing speed without generating a stress on the pair of substrates. As a result, the process can be simplified, and the time required for the process can be reduced.

On the other hand, when the vacuum suction is cancelled, the air flows quickly in the space between the flexible sheet member and the substrate on the upper side. This facilitates the separation of the flexible sheet member from the substrate on the upper side. Therefore, a tensile force generated with a cancellation of the vacuum suction can be reduced, thereby preventing the damage of the connected substrates and the peeling of sealing material. As a result, the method permits a high yield in manufacturing the liquid crystal panels even when adopting the substrates of a large size.

In the described method, it is preferable that the flexible sheet member is light transmissive. By selecting so, when hardening the light-hardening type sealing material by emitting light to be incident thereon, the light can be emitted from the side of the flexible sheet member.

More preferably, the described method of manufacturing liquid crystal panel of the present invention, further includes the steps of:

(α) adjusting respective positions of the pair of substrates;

(β) applying a pressure onto the light-hardening type sealing material by moving the pair of substrates to be approximated to one another; and (γ) hardening a predetermined temporary combining area of the light-hardening type sealing material by emitting light to be incident thereon.

By performing the described processes (α), (β), and (γ), the pair of substrates are temporarily combined in the state where the mutual positions thereof are adjusted. Thereafter, the final hardening process of the light-hardening type sealing material is applied by the described processes (b) through (e). As a result, the method permits a liquid crystal panel having an excellent positioning precision and a cell gap precision to be manufactured even when adopting substrates of a large size.

In order to fulfill the above-mentioned object, a press device for use in the method of manufacturing liquid crystal panels in accordance with the present invention includes:

a placement plate for placing thereon a pair of substrates;

a first flexible sheet member having fine protrusions and recessions formed entirely on a surface thereof, the first flexible sheet member being provided above the placement plate;

elevator means for moving the first flexible sheet member up and down;

sealing means for sealing a space between the first flexible sheet member and the placement plate when the first flexible sheet member is lowered;

discharge means for performing a vacuum suction in the space; and light emitting means for emitting light to be indicant on the pair of substrates.

The press device having the described arrangement permits the aforementioned method of manufacturing the liquid crystal panel to be realized with ease. Additionally, as a pressure is applied onto the pair of substrates using an atmospheric pressure, the requirement of large rigidity is eliminated from the conventional press device, thereby providing the press device of a compact size.

Further, it is preferable that the first flexible sheet member is light transmissive, and that the light emitting means is provided above the first flexible sheet member. In this arrangement, when hardening the light-hardening type sealing member by emitting light to be incident thereon, the light can be emitted from the side of the first flexible sheet member.

Alternatively, it is also preferable to arrange such that the placement plate is light transmissive, and that the light emitting means is provided under the placement plate. This arrangement also permits light to emitted from the side of the placement plate in the process of hardening the light-hardening type sealing member by emitting light to be indicant thereon. This arrangement involves another beneficial feature that the space required in the upper part of the device can be still reduced compared with the press device where the light emitting means is provided above the sheet member for pressure application use. This beneficial feature enables a press device of a still compact size to be provided.

It is preferable that the placement plate has fine protrusions and recessions on an area for placing thereon the pair of substrates. This permits the placement plate to be prevented from sticking to the substrate on the lower side, thereby preventing the damage of the substrates and the peeling of the sealing material that may occur when separating the pair of substrates, which have been connected, from the placement plate. Therefore, the described method permits the liquid crystal panel to be manufactured at high yield.

It is also preferable that the second flexible sheet member having fine protrusions and recessions uniformly formed on the surface thereof is provided on the surface for placing thereon the pair of substrates. According to the described arrangement, as the second flexible sheet member is provided, the surface of the placement plate can be prevented from sticking to the substrate on the lower side even when the surface of the placement plate is formed smooth. As a result, a damage of the substrate, a peeling of the sealing material that may occur when separating the connected substrates from the placement plate can be prevented, thereby enabling an improved yield of the liquid crystal panel. Additionally, by selecting the second flexible sheet member to be light transmissive, in the process of hardening the light-hardening type sealing material by emitting light to be incident thereon, the light can be emitted from the side of the placement plate.

The novel features which are considered as characteristic of the invention are set forth in particular in the appended claims. The improved treatment method, as well as the construction and mode of operation of the improved treatment apparatus, will, however, be best understood upon perusal of the following detailed description of certain specific embodiments when read in conjunction with the accompanying drawings.

BRIEF DESCRIPTION OF THE DRAWINGS

FIG. 3(a) is a view schematically showing an embossed sheet, and FIG. 3(b) is an enlarged view of an area of the embossed sheet.

FIG. 6(a) and FIG. 6(b) are longitudinal cross-sectional views which explain a pressurizing process by a final hardening press device in accordance with the present embodiment, wherein FIG. 6(a) shows a state before a vacuum suction is applied, while FIG. 6(b) shows a state where the vacuum suction is being applied.

FIG. 11(a) and FIG. 11(b) are longitudinal cross sectional views which explain a pressurizing process by the conventional final hardening press device, wherein FIG. 11(a) shows a state before a vacuum suction is applied, while FIG. 11(b) shows a state where a vacuum suction is being applied.

FIG. 13(a) and FIG. 13(b) are longitudinal cross-sectional views explaining a tensile force against the substrate generated after the pressurizing process is completed, wherein FIG. 13(a) shows a state where the vacuum suction is being performed, while FIG. 13(b) shows a state where the vacuum suction is cancelled.

DESCRIPTION OF THE EMBODIMENTS

The following descriptions will discuss one embodiment of the present invention in reference to FIG. 1 through FIG. 6.

Figure 1:
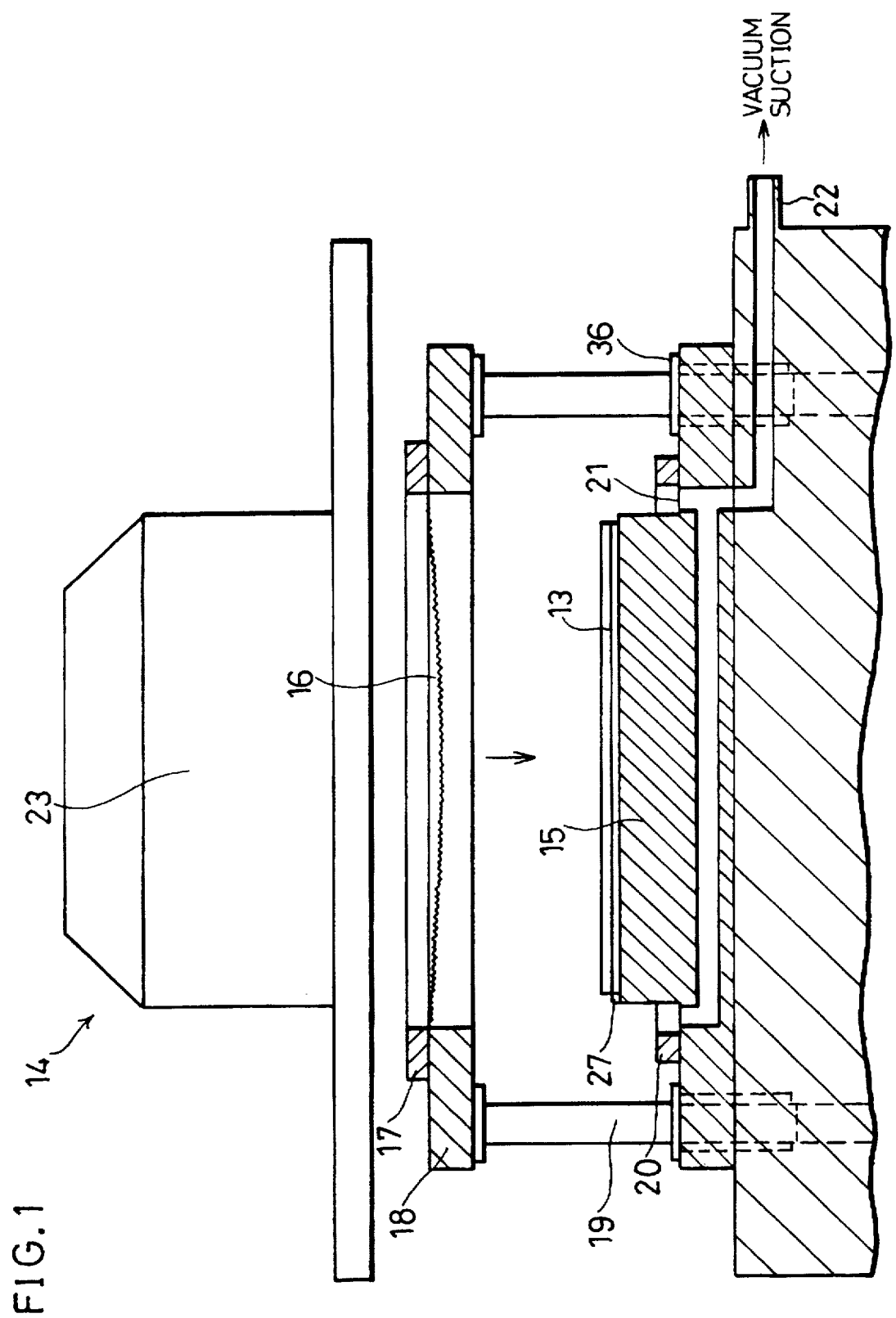
FIG. 1 is a longitudinal cross-sectional view of a final hardening press device in accordance with the first embodiment of the present invention.
Figure 2:
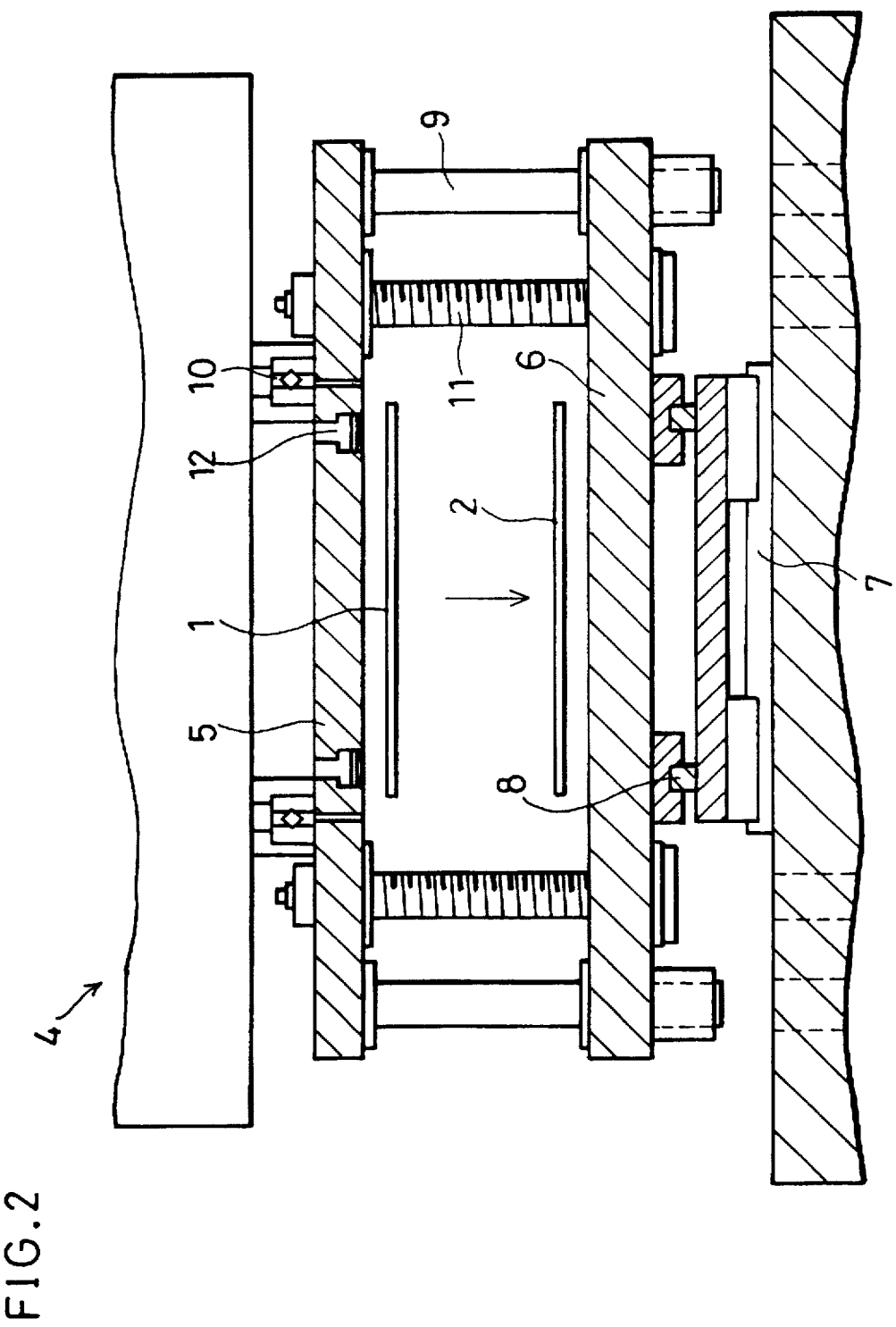
FIG. 2 a longitudinal cross-sectional view of a temporary hardening press device in accordance with embodiments of the present invention.

FIG. 1 is a longitudinal cross-sectional view of a final hardening press device 14 in accordance with the first embodiment, and FIG. 2 is a longitudinal cross-sectional view of a temporary hardening press device 4 in accordance with the present embodiment.

As shown in FIG. 1, the final hardening press device 14 includes a stage (placement plate) 15, an embossed sheet (first flexible sheet member) 16, a stage frame (sealing means) 18, a fixing member 17, an elevator guide (elevator means) 19, a guide cylinder 36, a sealing frame (sealing means) 20, a discharge hole (discharge means) 21, a discharge opening (discharge means) 22 and a UV lamp (light emitting means) 23. The stage 15 is provided for placing thereon a temporary fixed substrate 13. The embossed sheet 16 is provided above the stage 15, and is arranged so as to cover the temporary fixed substrate 13 placed on the stage 15 at a lowered position. The stage frame 18 surrounding the stage 15 can be freely raised and lowered. The fixing member 17 fixes the circumference of the embossed sheet 16 onto the stage frame 18. The elevator guide 19 which is freely moved up and down is provided so as to fix the stage frame 18 at an end portion. The guide cylinder 36 is provided to make vertical movements of the elevator guide 19 smoother. The sealing frame 20 seals a space between the embossed sheet 16 and the stage 15 together with the stage frame 18. The discharge hole 21 and the discharge opening 22 are provided for applying a vacuum suction to a sealed space between the embossed sheet 16 and the stage 15. The UV lamp 23 is provided above the embossed sheet 16 for emitting a ultraviolet ray to be incident on the temporary fixed substrate 13.

The embossed sheet 16 is a plastic film, for example, made of a flexible material which is transmissive to light such as polyester with a thickness of 75 μm. As shown in FIG. 3(a), the embossed sheet 16 has fine protrusions and recessions uniformly formed on the surface thereof. As shown in FIG. 3(b), a width B of such protrusions and recessions is in a range of around 10 and 200 μm. Further, it is arranged such that when applying a vacuum suction process (to be described later), exhaustion of an air can be promptly performed without having an air remaining in a space between the embossed sheet 16 and an upper substrate of the temporary fixed substrate 13.

As shown in FIG. 2, the temporary hardening press device 4 includes an upper stage 5, a lower stage 6, an image processing system (not shown), an x-axis guide 7, a Y-axis guide 8, a Z-axis guide 9, θ-axis guide 10, an elevator ball screw 11 and a spot UV emission lamp 12. The upper stage 5 and the lower stage 6 respectively suck the substrate 1 and the substrate 2. The upper stage 5 is provided so as to be freely moved up and down, and is arranged such that a suction face of the substrate 1 is flat. The lower stage 6 is also arranged such that a suction face of the substrate 2 is flat. The image processing system recognizes alignment marks on the substrates 1 and 2 to obtain positioning information of the substrates 1 and 2. The X-axis guide 7, the Y-axis guide 8, the Z-axis guide 9 and the θ-axis guide 10 are provided so as to perform the positioning of the substrates 1 and 2 based on the positioning information. The elevator ball screw 11 is provided for raising and lowering the upper stage 5.

Figure 4:
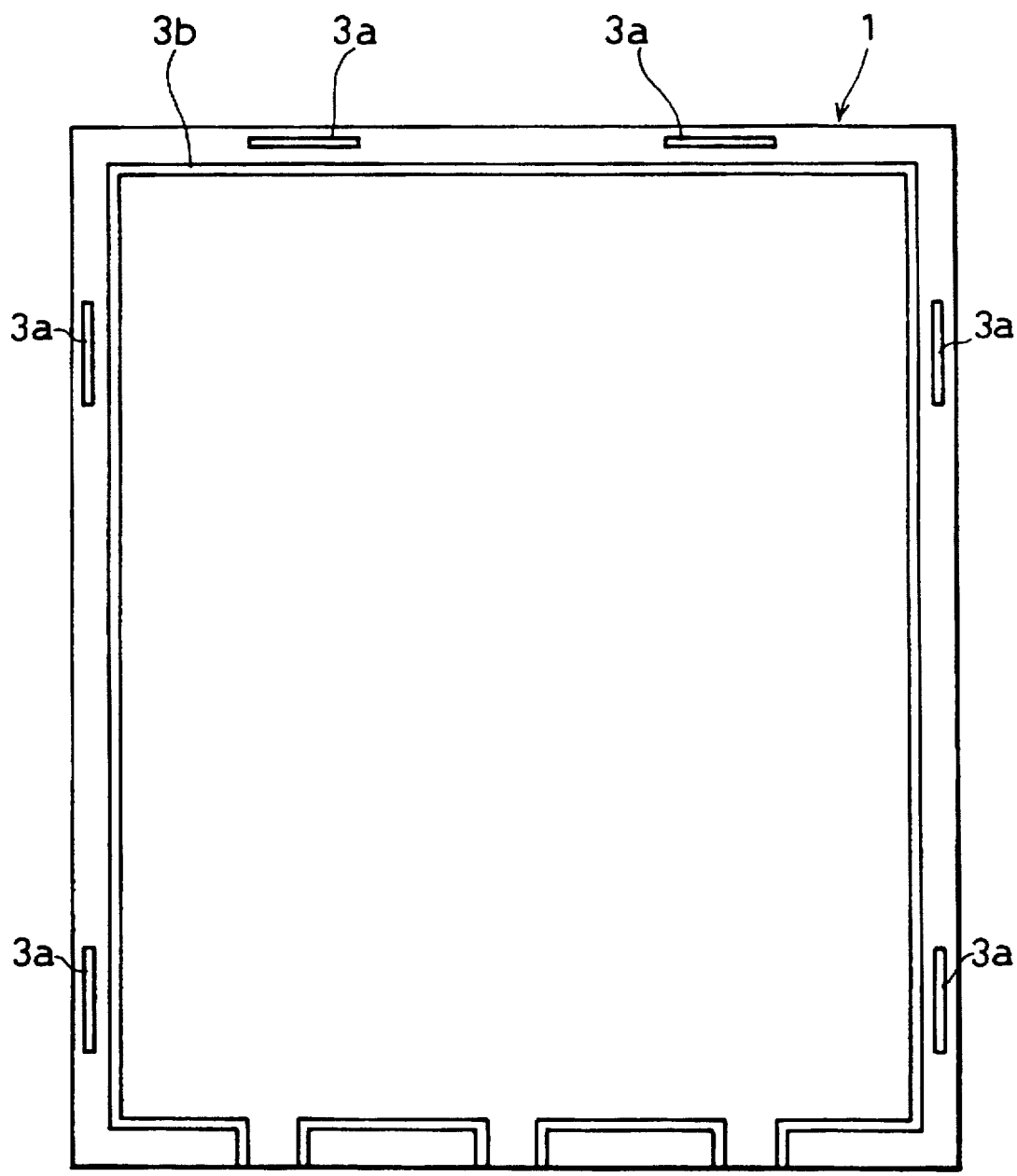
FIG. 4 is a view schematically showing a substrate which shows an example of an application pattern of a sealing material made of a ultraviolet-curing resin.

In the method of manufacturing the liquid crystal panels in accordance with the present embodiment, first, after forming orientation films respectively on the substrates 1 and 2, sealing materials 3a and 3b made of ultraviolet-curing resins are applied to the substrate 1 in the pattern shown in FIG. 4. The sealing material 3a is applied for temporarily fixing the substrates 1 and 2 by the temporary hardening press process, and the sealing material 3b is applied to finally fix the substrates 1 and 2 after forming a desired cell gap between them by the final hardening press process. Additionally, spacers for maintaining a uniform cell gap are dispersed on the substrate 2.

In the temporary hardening press process, a substrate 1 is sucked on the upper stage 5 of the temporary hardening press device 4, and sucks the substrate 2 onto the lower stage 6. Next, using the image process system, the positioning information of the substrates 1 and 2 is obtained from the alignment marks on the substrates 1 and 2, and the respective positions of the substrates 1 and 2 are adjusted by the X-axis guide 7, the Y-axis guide 8, the Z-axis guide 9 and the θ-axis guide 10 based on the positioning information. Thereafter, the upper stage 5 is lowered by rotatably driving the elevator ball screw 11 to move the substrate 1 closer to the substrate 2 so as to apply a predetermined pressure (0.03–0.04 kg/cm$^2$) until a nearly desired cell gap is formed between the substrates 1 and 2. Between the sealing materials 3a and 3b thus pressed, only the sealing material 3a for use in temporary positioning is irradiated with a UV ray by the spot incident UV lamp 12 to harden the sealing material 3a, thereby obtaining the temporary fixed substrate 13.

In the final hardening press process in accordance with the present embodiment, first, a temporary fixed substrate 13 is placed on the stage 15 of the final hardening press device 14 by positioning it with a pin 27 provided on the stage 15. Next, the stage frame 18 is moved down by the elevator guide 19 so as to seal a space between the embossed sheet 16 and the stage 15 by making the lower surface of the stage frame 18 in tight contact with the sealing frame 20. Thereafter, the sealed space is subject to the vacuum suction. By performing the vacuum suction, the temporary fixed substrate 13 in the space is pressed under an atmospheric pressure on the embossed sheet 16.

Figure 5:
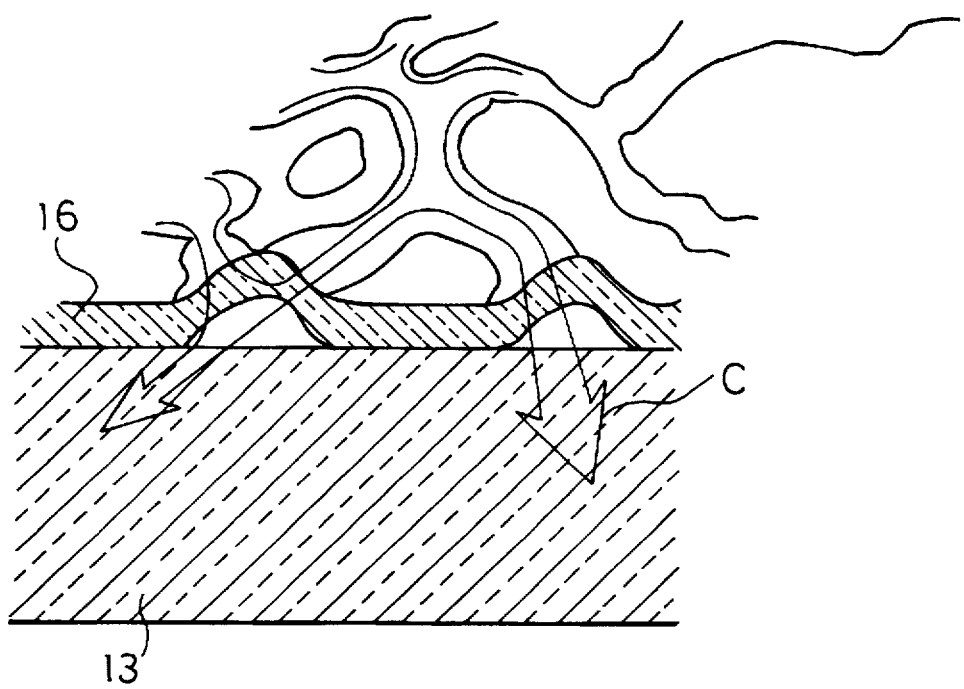
FIG. 5 is a perspective view which explains that protrusions and recessions of the embossed sheet facilitate an air exhaustion.
Figure 6A:
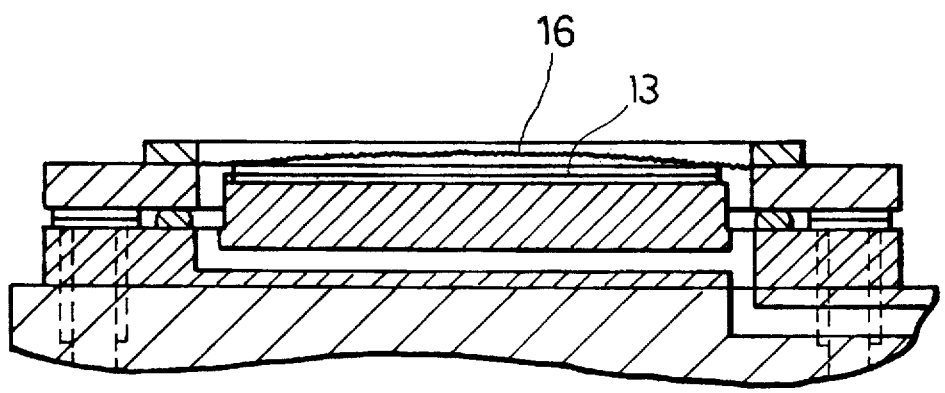
Figure 6B:
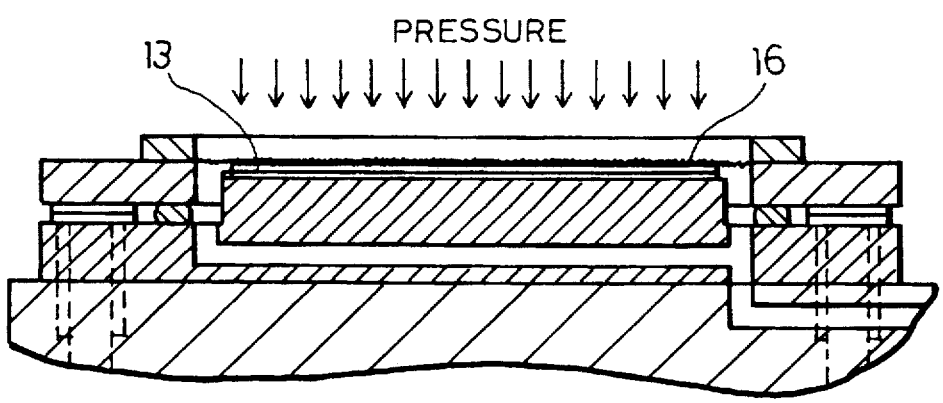
Figure 11A:
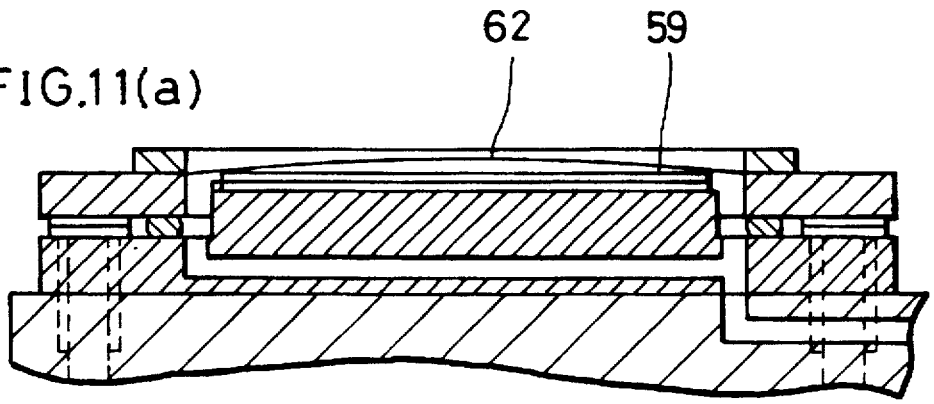
Figure 11B:
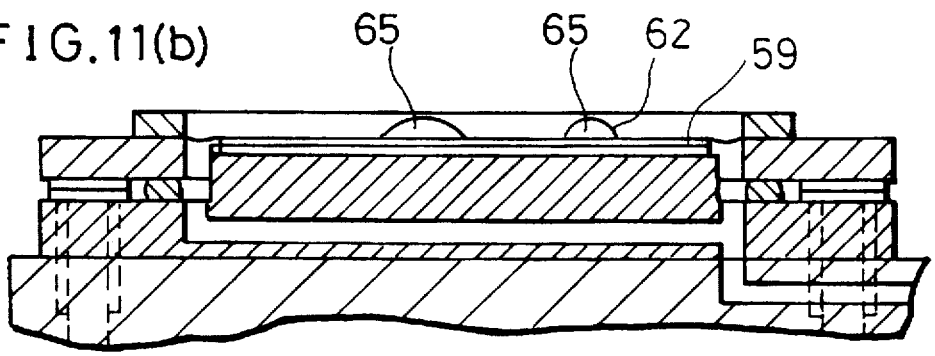
Figure 12:
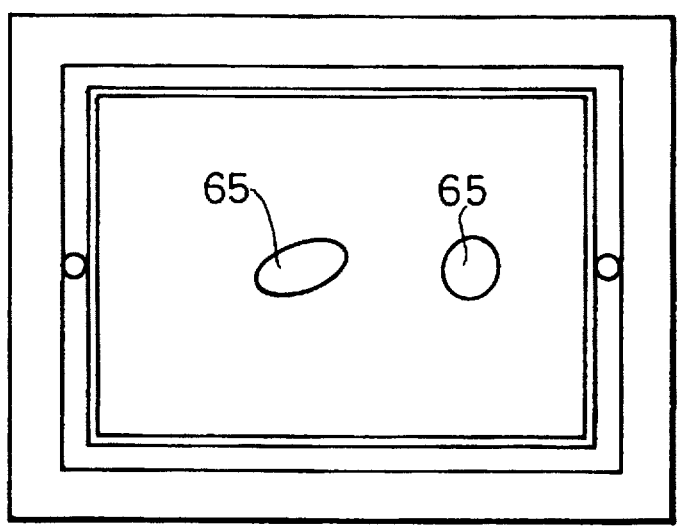
FIG. 12 is a view showing a state where air remains when performing a pressurizing process by the conventional final hardening press device.
Figure 13A:
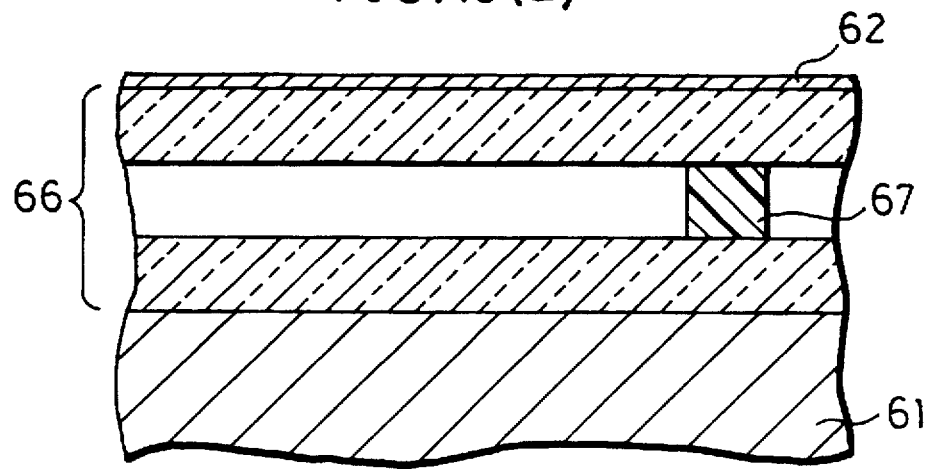
Figure 13B:
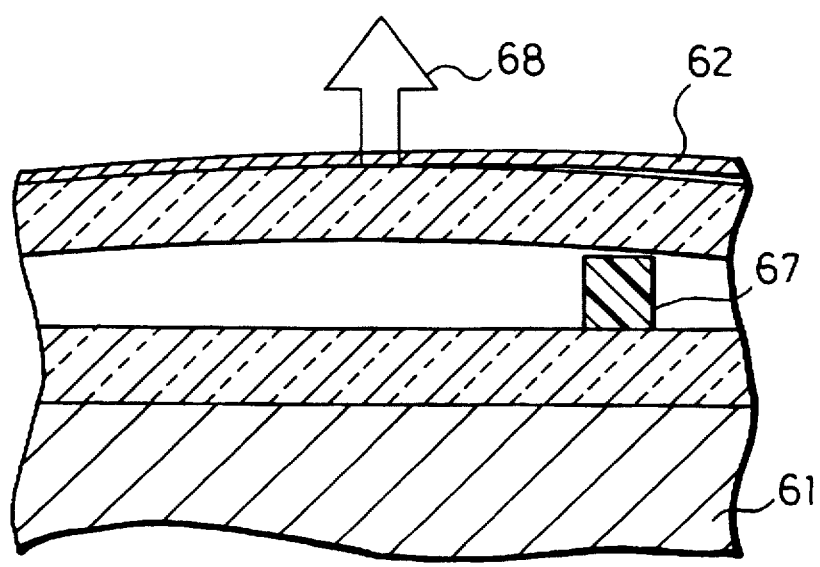

When performing the vacuum suction, as indicated by an arrow C in FIG. 5, the protrusions and recessions uniformly formed on the embossed sheet 16 facilitate an air exhaustion in the space between the embossed sheet 16 and the temporary fixed substrate 13, and thus, an air would not remain in the space as shown in FIGS. 11(a) and (b) and FIG. 12. Therefore, when performing a vacuum suction shown in FIG. 6(a) and FIG. 6(b), an atmospheric pressure can be applied uniformly on the entire surface of the temporary fixed substrate 13, thereby forming a uniform cell gap within the temporary fixed substrate 13.

With regard to the vacuum suction process, when a vacuum suction is applied abruptly, a pressure would be applied abruptly, which would result in a large stress generated on the substrate. Therefore, to avoid the described problem, in the conventional method, the vacuum suction process is performed by the two stages (a process of low pressure reducing speed and a process of high pressure reducing speed). Namely, the first vacuum suction is gradually performed until the reduced pressure becomes approximately 200 Torr, and then, the second vacuum suction is performed to make the reduced pressure to 400 Torr or less, or by means of two kinds of pressure reducing devices and the like. In the final hardening press device 14 in accordance with the present embodiment, as the protrusions and recessions are formed on the surface of the embossed sheet 16, an air remaining in the space between the embossed sheet 16 and the temporary fixed substrate 13 can be exhausted uniformly and promptly. Thus, it is not necessarily to divide the process into two or more stages of different pressure reducing speeds nor using two or more kinds of pressure reducing devices. According to the method of the present embodiment, by reducing the pressure to around 400 Torr at a fixed pressure reducing speed, the vacuum suction can be performed promptly without generating a large stress on the temporary fixed substrate 13.

The conventional press device adopting the surface plate requires the condition of an applied pressure of around 1 kg/cm$^2$ to form a uniform cell gap. By adopting the vacuum press device which permits a uniform application of pressure with high precision, a uniform cell gap can be formed without problems under a vacuum pressure of around 400 Torr.

As described, after forming a uniform cell gap in the temporary fixed substrate 13, a ultraviolet ray is emitted to be incident on the entire surface of the temporary fixed substrate 13 by the UV lamp 23 from the embossed sheet 16 side to harden the sealing material 3b so as to connect stick the substrate 1 and the substrate 2 together. Here, with an emission of a ultraviolet ray onto the display area of the liquid crystal, if an orientation film inferior, deterioration of the TFT characteristics occur which would lower a display quality, the ultraviolet ray is emitted partially using a mask substrate to eliminate the described problem.

After connecting the substrates 1 and 2, the vacuum suction applied in the space between the embossed sheet 16 and the stage 15 is cancelled. Here, by the protrusions and recessions formed on the surface of the embossed sheet 16, an air would flow promptly between the embossed sheet 16 and the final fixed substrate to facilitate the separation of the embossed sheet 16 from the final fixed substrate. As this reduces a tensile force generated against the substrate upon cancelling the vacuum suction, the problem of peeling the sealing material 3b and damaging the final fixed substrate hardly occur.

The final fixed substrate manufactured in the described process goes through the further processes of cut division, liquid crystal injection, mounting of a polarized plate, etc., thereby obtaining a liquid crystal panel. On the liquid crystal panel thus manufactured, a uniform gap is formed by the final hardening press device 14. Further, when applying the final hardening process, as the positioning of the substrates 1 and 2 is adjusted by the temporary hardening press device 4, an excellent positioning precision and a cell gap precision can be achieved.

Furthermore, as the temporary hardening press device 4 does not require an applied large pressure, and uses an atmospheric pressure in the final hardening press device 14, neither the temporary hardening press device 4 nor the final hardening press device 14 require rigidity, thereby enabling a miniaturization of the device.

The results of comparison in yield between the liquid crystal panel manufactured by the described method of the present embodiment and the liquid crystal panel manufactured by the conventional vacuum press method adopting a plastic sheet are shown in Table 1. The resulting product was determined to be a liquid crystal panel of good quality satisfying the condition that the error of the cell gap is in a range of ±0.3 μm on the surface of the panel as a whole. As shown in Table 1, the yield of the liquid crystal panel manufactured using the conventional flat plastic sheet was lowered as the panel size becomes large in size. Especially, when manufacturing the panel with a size of not less than 320×400 mm, the yield was suddenly dropped. On the other hand, the yield in manufacturing the liquid crystal panel using the embossed sheet 16 of the present embodiment remained high even when dealing with the panel of a large size.

| PANEL SIZE | YIELD OF LIQUID CRYSTAL PANEL BY CONVENTIONAL VACUUM PRESS METHOD (GOOD PRODUCTS/ ALL PRODUCTS) | YIELD OF LIQUID CRYSTAL PANEL BY VACUUM PRESS METHOD OF PRESENT EMBODIMENT (GOOD PRODUCTS/ ALL PRODUCTS) |
| --- | --- | --- |
| φ6 INCH WAFER | 20/20 | 20/20 |
| 150 mm × 150 mm | 20/20 | 20/20 |
| 320 mm × 400 mm | 16/20 | 20/20 |
| 360 mm × 465 mm | 15/20 | 20/20 |
| 550 mm × 650 mm | 11/20 | 19/20 |

In the described preferred embodiment, a polyester which has excellent characteristics in its chemical resistance, permanence, light-transmissivity, and heat resistance (melting point in a range of 255°–260° C.) is used as a material for the embossed sheet 16. However, a material for the embossed sheet 16 is not limited to polyester, for example, polyethylene, vinyl chloride or polypropylene, etc., may be adopted as well. The embossed sheet 16 with a thickness of around 75 μm is adopted in the present embodiment; however, the thickness of the embossed sheet 16 may be altered in a range of, for example, from around 9 μm to around 1 mm. Furthermore, the shape of the protrusions and recessions of-the present embodiment is not limited as long as the circulation of the air flow between the embossed sheet 16 and the temporary fixed substrate 13 is facilitated. Thus, the surface may be formed in a checkered manner, in a wave pattern, a wood grain pattern, an arabesque pattern, etc., other than the shape shown in FIG. 3(a).

Figure 7:
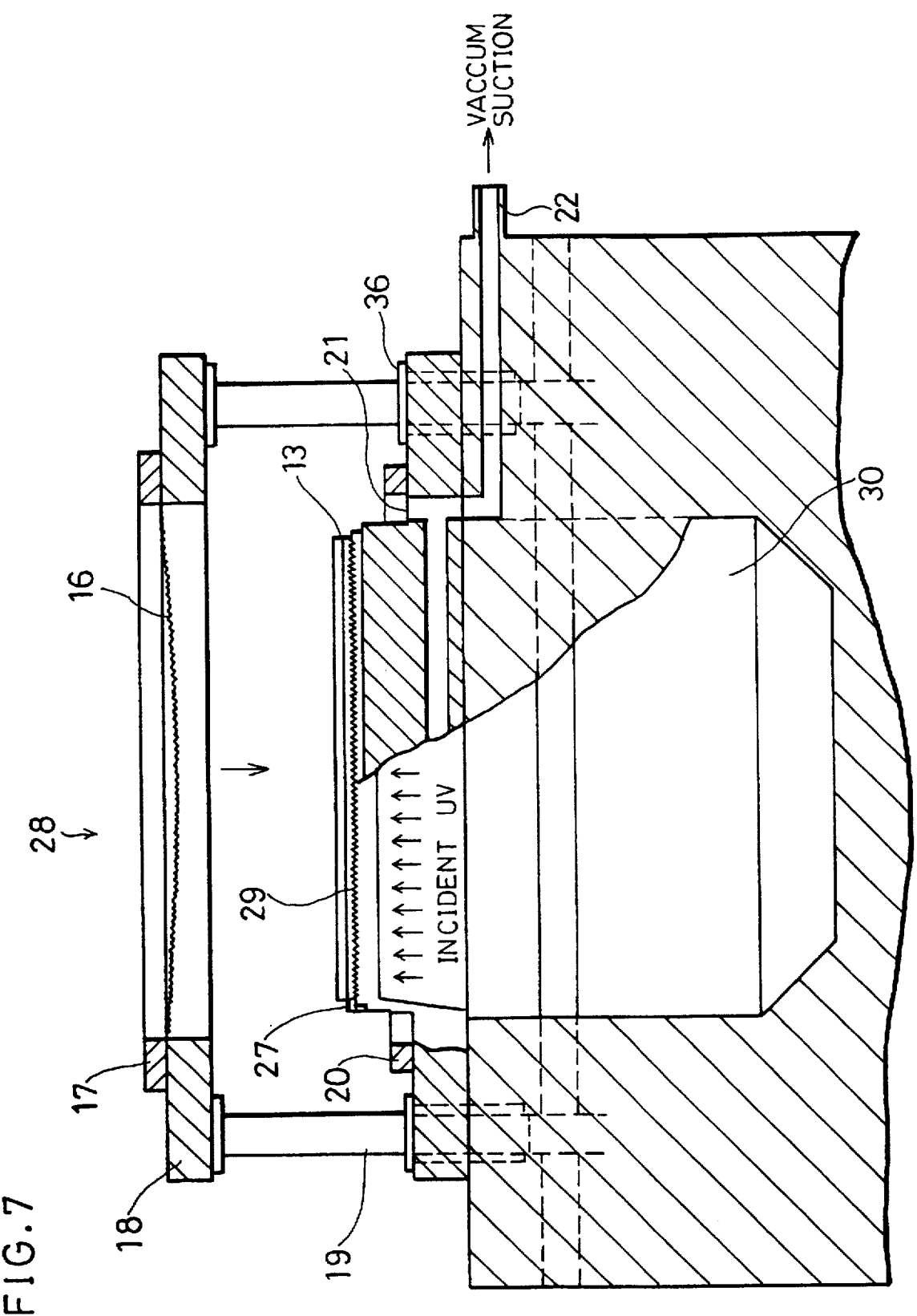
FIG. 7 is a longitudinal cross-sectional view of a final hardening press device in accordance with the second embodiment of the present invention.

The following descriptions will discuss the second embodiment of the present invention in reference to FIG. 7. Here, members having the same or similar function as or to those of the aforementioned embodiment will be designated by the same reference numerals, and thus the descriptions thereof shall be omitted here.

FIG. 7 is a longitudinal cross-sectional view of the final hardening press device 28 in accordance with the second embodiment of the present invention. In this final hardening press device 28, a stage 29 (placement plate) for placing thereon a temporary fixed substrate 13 has protrusions and recessions formed on the surface thereof in an area where the temporary fixed substrate 13 is placed. Specifically, a groove with a depth of around 100 μm is formed in the longitudinal direction of the stage 29. For the stage 29, a quartz glass which has high light-transmissivity and rigidity and offers high precision of flatness is used.

Furthermore, the final hardening press device 28 in accordance with the present embodiment is arranged such that a UV lamp (light emitting means) 30 is provided under the stage 29 different from the final hardening press device 14 where the UV lamp 23 is provided above the embossed sheet 16 of the first embodiment.

According to the arrangement of the final hardening press device 28 of the present embodiment, a ultraviolet ray may be directed onto the temporary fixed substrate 13 from the side of the stage 29. This feature would be appreciated in the case where the surface to be irradiated with a ultraviolet ray is limited as many light blocking patterns or metal wiring exist on the upper substrate.

In the final hardening press process by the final hardening press device 28 of the present embodiment, after performing the temporary hardening press process in the same manner as the first embodiment, the temporary fixed substrate 13 is fixed onto the stage 29 with the pin 27. Next, the stage frame 18 is lowered by the elevator guide 19 so that the lower surface of the stage frame 18 is in tight contact with the sealing frame 20. Thereafter, a space between the embossed sheet 16 and the stage 29 is sealed to allow a vacuum suction to be performed in the space. By the described vacuum suction, the temporary fixed substrate 13 is pressed under an atmospheric pressure.

As described, the temporary fixed substrate 13 is pressed under vacuum, and a desired cell gap is formed uniformly on the entire surface. Thereafter, a UV light is directed onto the entire surface of the temporary fixed substrate 13 by the ultraviolet ray lamp 30 from the side of the stage 29. As the stage 29 is transmissive to light, a sealing material 3b can be hardened by directing thereon a UV ray through the stage 29. In the described manner, a desired cell gap is formed, and the final fixed substrate obtained by connecting the substrates 1 and 2 go through the further process of cutting, liquid crystal injection, mounting of a polarization plate, etc., thereby manufacturing a liquid crystal panel.

After the substrates 1 and 2 are connected, the vacuum suction applied between the embossed sheet 16 and the stage 29 is cancelled. Here, as the fine protrusions and recessions formed on the embossed sheet 16 permits air to enter between the embossed sheet 16 and the final fixed substrate promptly, a tensile force generated with the cancellation of the vacuum suction can be reduced, thereby preventing an occurrence of such problem as peeling of the sealing material 3b, damaging the final fixed substrate, etc.

Furthermore, as fine protrusions and recessions are formed in an area where the substrate is placed, the final fixed substrate can be prevented from sticking to the stage 29. This features offer the effect that a damage of the final fixed substrate and the peeling of the sealing material 3b can be eliminated, which may occur when removing the final fixed substrate after the vacuum suction is cancelled, thereby improving the yield in manufacturing the liquid crystal panel.

Furthermore, as the ultraviolet ray lamp 30 is formed below the stage 29, a space required in the upper part of the device can be made smaller compared with the arrangement of the final hardening press device 14 adopted in the first embodiment, thereby providing the final hardening press device 28 of a still compact size.

In the present embodiment, a quartz glass is adopted for the material of the stage 29; however, other materials which have high light-transmissivity, rigidity and offer a high precision of flatness may be adopted such as soda lime glass, borosilicate glass, almino-silicate glass, lead glass, etc., may be adopted.

In the present embodiment, by forming a groove with a depth of 100 μm in a longitudinal direction of the stage 29, fine protrusions and recessions are formed on the stage 29. However, the present invention is not limited to this arrangement, for example, the surface of the stage 29 may be formed in a checkered manner, in a wave pattern, a wood grain pattern, an arabesque pattern, etc., as long as the light transmissivity, rigidity and a high precision of flatness of the stage 29 can be ensured.

The final hardening press device 28 of the present embodiment is arranged such that fine protrusions and recessions are formed in the area where the temporary fixed substrate 13 is placed. However, the described arrangement may be combined with the arrangement where the UV lamp 23 is provided above the embossed sheet 16 like the final hardening press device 14 of the first embodiment.

Figure 8:
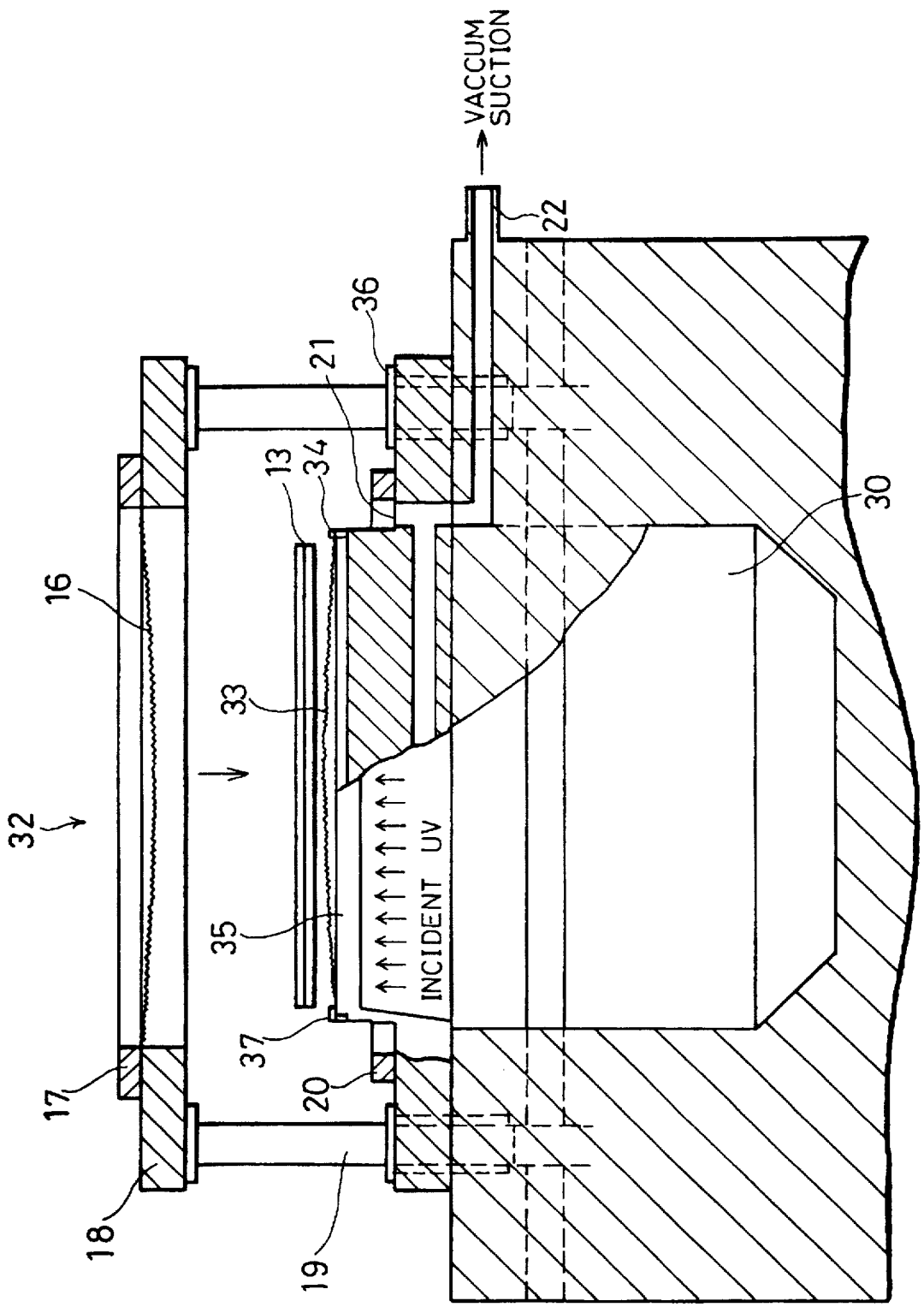
FIG. 8 is a longitudinal cross-sectional view of a final hardening press device in accordance with the third embodiment of the present invention.
Figure 9:
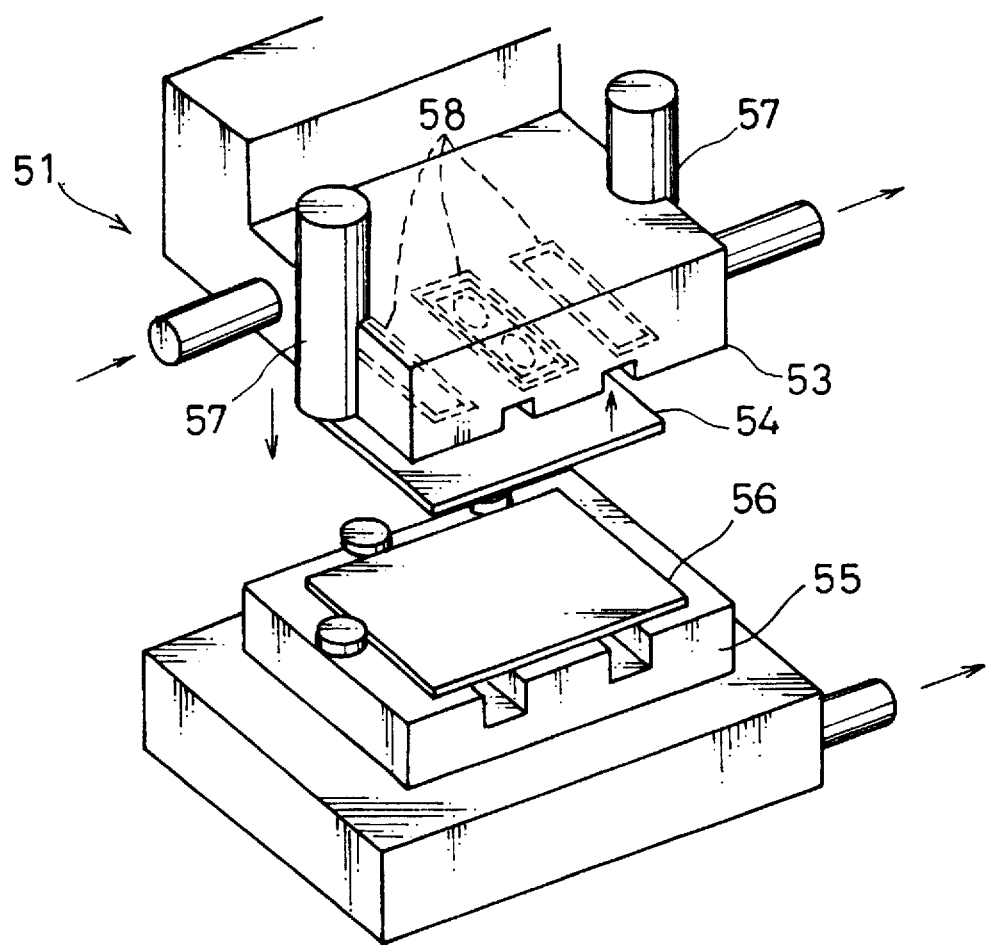
FIG. 9 is a perspective view of a conventional temporary hardening press device.
Figure 10:
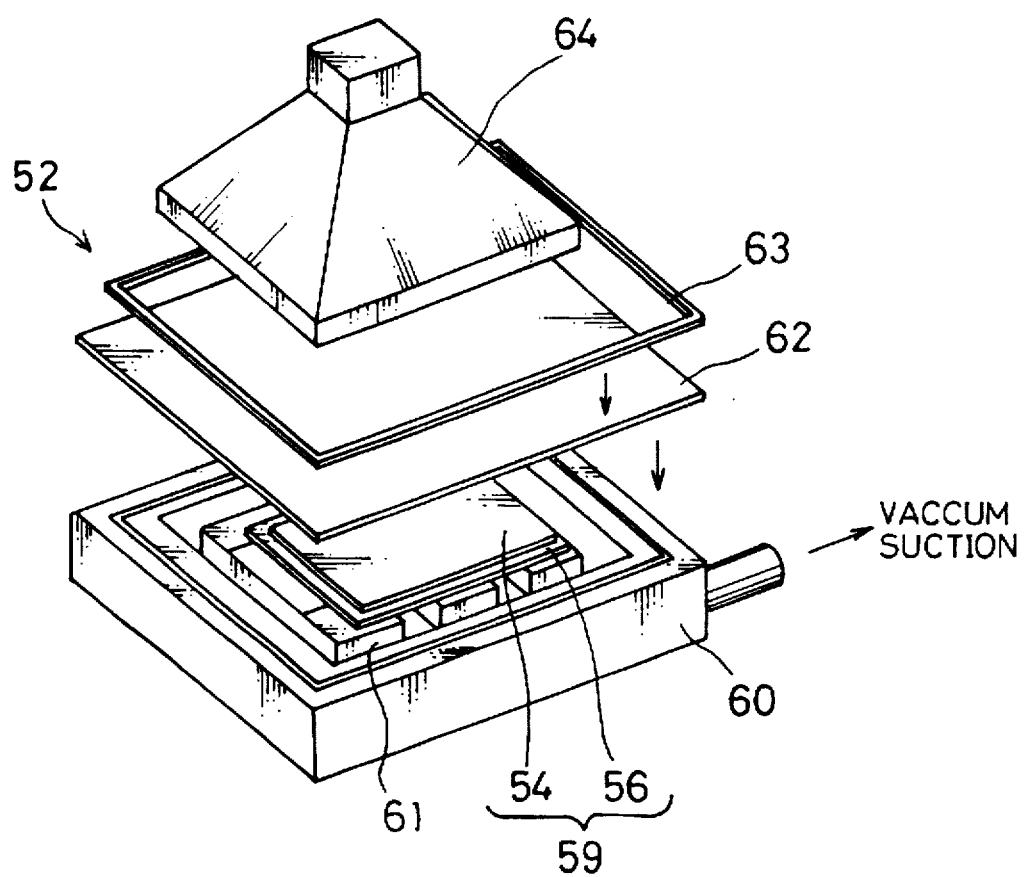
FIG. 10 is a perspective view of a conventional final hardening press device.

The following descriptions will discuss the third embodiment of the present invention in reference to FIG. 8. Here, members having the same or similar function as or to those of the aforementioned embodiment will be designated by the same reference numerals, and thus the descriptions thereof shall be omitted here.

FIG. 8 is a longitudinal cross-sectional view of a final hardening press device 32 in accordance with the embodiment. The final hardening press device 32 in accordance with the present embodiment is arranged such that the second embossed sheet (second flexible sheet member) 33 is fixed by the pins 34 and 37 on the stage 35, and the stage (placement plate) 35 does not have fine protrusions and recessions in the area where the temporary fixed substrate 13 is placed compared with the final hardening press device 28 in accordance with the second embodiment. The second embossed sheet 33 is transmissive to light and has fine protrusions and recessions formed uniformly on the entire surface. The features of the embossed sheet 33 in its material, thickness, shape of protrusions and recessions, width of protrusions and recessions and characteristics are the same as the embossed sheet 16 adopted in the previous embodiment.

For the material of the stage 35, a quartz glass having high light-transmissivity, rigidity and precision in flatness is adopted.

According to the present embodiment of the final hardening press device 32, a ultraviolet ray may be emitted to be incident on the temporary fixed substrate 13 from the side of the stage 35. This feature would be appreciated in the case where the surface to be irradiated with a ultraviolet ray is limited as many light blocking patterns or metal wiring exist on the upper substrate.

In the final hardening press process by the final hardening press device 32 of the present embodiment, after performing the same temporary hardening press process as the first and second embodiments, the temporary fixed substrate 13 is fixed on the stage 35 with the pins 37. Next, the stage frame 18 is lowered by the elevator guide 19 so that the lower surface of the stage frame 18 is in tight contact with the sealed frame 20. Thereafter, a space between the embossed sheet 16 and the stage 35 is sealed to allow a vacuum suction to be performed through the space. By the vacuum suction, the temporary fixed substrate 13 is pressed under atmospheric pressure on the embossed sheet 16.

As described, the temporary fixed substrate 13 is pressed under vacuum, and a desired cell gap is formed uniformly on the entire surface thereof. Thereafter, a UV ray is directed onto the entire surface of the temporary fixed substrate 13 by the UV ray lamp 30 from the side of the stage 35. Here, as the stage 35 is transmissive to light, a sealing material 3b can be hardened by the emission of a UV ray through the stage 35 and the second embossed sheet 33. In the described manner, a desired cell gap is formed, and the final fixed substrate obtained by connecting the substrates 1 and 2 go through the further process of cut division, liquid crystal injection, a mounting of a polarization plate, etc., thereby manufacturing a liquid crystal panel.

After the substrates 1 and 2 are connected, the vacuum suction applied between the embossed sheet 16 and the stage 35 is cancelled. Here, as air circulates between the embossed sheet 16 and the final fixed substrate, a tensile force generated with the cancellation of the vacuum suction can be reduced. Thus, a peeling of the sealing material 3b and the damage of the final fixed substrate hardly occurs.

Furthermore, the second embossed sheet 33 prevents the final fixed substrate from sticking to the stage 35. This eliminates the problems which may occur when separating the final fixed substrate after the vacuum suction is cancelled, such as a damage of the substrate, a peeling of the sealing material 3b, etc. Therefore, the method enables liquid crystal panels to be manufactured at high yield.

Additionally, as the ultraviolet ray lamp 30 is provided under the stage 35, a space required in the upper part of the device can be made smaller compared with the arrangement of the final hardening press device 14 adopted in the first embodiment where the UV lamp 23 is provided above the embossed sheet 16, thereby providing the final hardening press device 32 of a still compact size.

In the present embodiment, a quartz glass is adopted for the material of the stage 35; however, other materials which have high light-transmissivity, rigidity and offer a precision in flatness may be adopted such as soda lime glass, borosilicate glass, almino-silicate glass, lead glass, etc., may be adopted.

For the material of the second embossed sheet 33, polyester is adopted in the present embodiment; however, polyethylene, vinyl chloride or polypropylene, etc., may be adopted as well. Similarly, the thickness of the second embossed sheet 33 is set to around 75 μm. However, the thickness may be altered, for example, within a range of around 9 μm and 1 mm. Furthermore, the protrusions and recessions on the surface of the second embossed sheet 33 are not limited as long as the second embossed sheet 33 can be prevented from sticking to the final fixed substrate. Thus, the surface may be formed in a checkered manner, in a wave pattern, a wood grain pattern, an arabesque pattern, etc., other than the shape shown in FIG. 3(a).

In the final hardening press device 32 in accordance with the present embodiment, the second embossed sheet 33 is fixed onto the stage 35 with the pins 34 and 37. Such an arrangement may be combined with the arrangement of the final hardening press device 14 where the UV lamp 23 is provided above the embossed sheet 16.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of manufacturing a liquid crystal panel which comprises the step of connecting a pair of substrates using a light-hardening type sealing material, comprising the steps of:

temporarily combining said pair of substrates by applying the light-hardening type sealing material to at least one of said pair of substrates;

placing said pair of substrates on a placement plate;

superimposing a flexible sheet member having fine protrusions and recessions on an entire surface thereof;

uniformly applying a pressure entirely onto said pair of substrates under an atmospheric pressure by applying a vacuum suction to a sealed space between the placement plate and the flexible sheet member; and hardening the light-hardening type sealing material by emitting light to be incident thereon.

2. The method of manufacturing a liquid crystal panel as set forth in claim 1, wherein:

said flexible sheet member is transmissive to light.

3. The method of manufacturing a liquid crystal panel as set forth in claim 1, wherein:

said flexible sheet member is a plastic film.

4. The method of manufacturing a liquid crystal panel as set forth in claim 3, wherein:

said flexible sheet member is made of polyester.

5. The method of manufacturing a liquid crystal panel as set forth in claim 1, further comprising the steps of:

adjusting respective positions of said pair of substrates;

applying a pressure onto the light-hardening type sealing material by approximating said pair of substrates to one another; and hardening a predetermined temporary combining area of the light-hardening type sealing material by emitting light to be incident thereon.

6. A press device for use in manufacturing a liquid crystal panel, comprising:

a placement plate for placing thereon a pair of substrates;

a first flexible sheet member having fine protrusions and recessions formed entirely on a surface thereof, said first flexible sheet member being provided above said placement plate;

elevator means for moving said first flexible sheet member up and down;

sealing means for sealing a space between said first flexible sheet member and said placement plate when the first flexible sheet member is lowered;

discharge means for applying a vacuum suction to the space; and light emitting means for emitting light to be incident on said pair of substrates.

7. The press device for use in manufacturing a liquid crystal panel as set forth in claim 6, wherein:

said first flexible sheet member is a plastic film.

8. The press device for use in manufacturing liquid crystal panel as set forth in claim 7, wherein:

said first flexible sheet member is made of polyester.

9. The press device for use in manufacturing a liquid crystal panel as set forth in claim 6, wherein:

said first flexible sheet member is transmissive to light, and said light emitting means is provided above said first flexible sheet member.

10. The press device for use in manufacturing a liquid crystal panel as set forth in claim 6, wherein:

said placement plate is transmissive to light, and said light emitting means is provided under said placement plate.

11. The press device for use in manufacturing a liquid crystal panel as set forth in claim 10, wherein:

said placement plate is made of quartz glass.

12. The press device for use in manufacturing a liquid crystal panel as set forth in claim 6, wherein:

said placement plate has fine protrusions and recessions at least in an area in which said pair of substrates is placed.

13. The press device for use in manufacturing a liquid crystal panel as set forth in claim 6, further comprising:

a second flexible sheet member having fine protrusions and recessions uniformly formed on a surface for placing thereon said pair of substrates of said placement plate.

14. The press device for use in manufacturing a liquid crystal panel as set forth in claim 13, wherein:

said second flexible sheet member is transmissive to light.

15. The press device for use in manufacturing a liquid crystal panel as set forth in claim 13, wherein:

said second flexible sheet member is a plastic film.

16. The press device for use in manufacturing liquid crystal panel as set forth in claim 15, wherein:

said second flexible sheet member is made of polyester.

* * * * *